Aug. 24, 1954
M. C. IHRKE
2,687,078
AUTOMATIC ELECTRIC TOASTER WITH MOTOR
DRIVEN CARRIAGE AND TIMER
Filed July 11, 1951
3 Sheets-Sheet 1
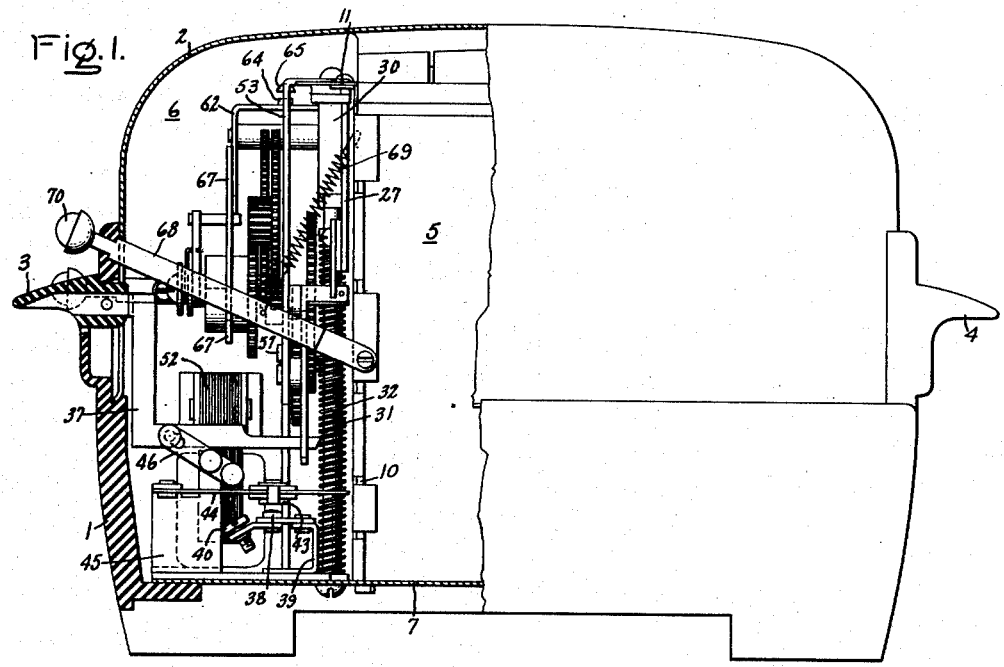
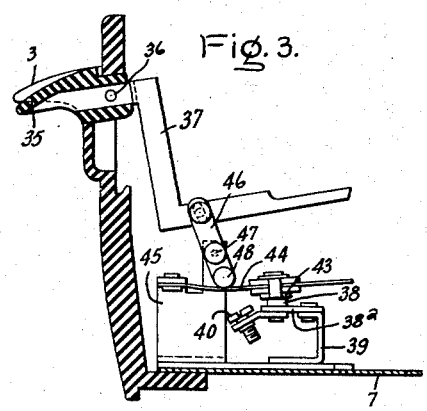
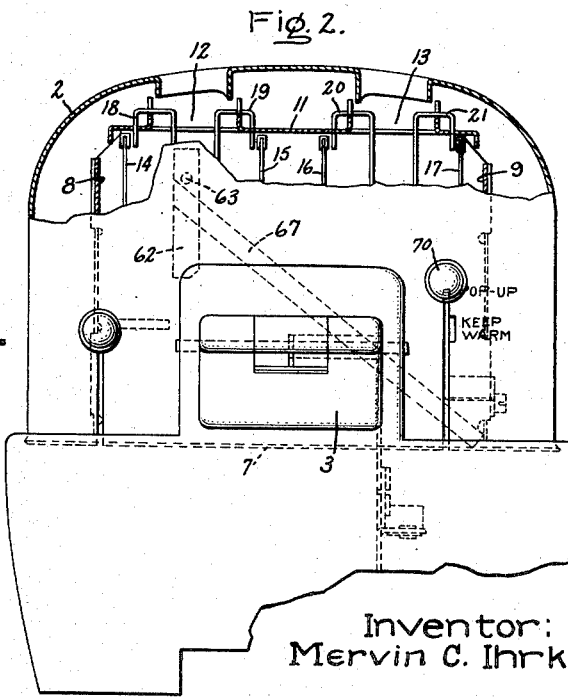
Inventor:
Mervin C. Ihrke,
by *Sheridan & Ross*
His Attorney.

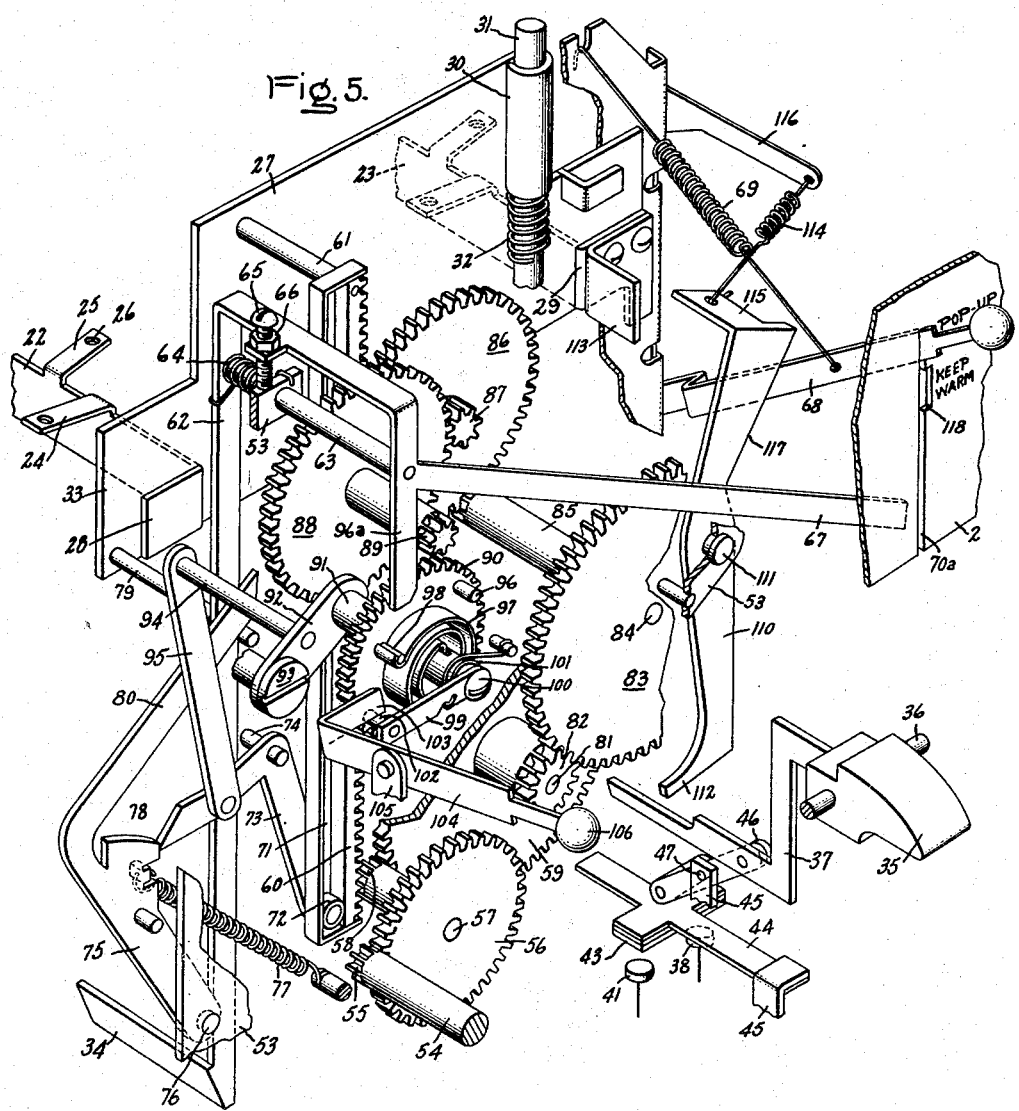

Aug. 24, 1954
M. C. IHRKE
2,687,078
AUTOMATIC ELECTRIC TOASTER WITH MOTOR
DRIVEN CARRIAGE AND TIMER
Filed July 11, 1951
3 Sheets-Sheet 3
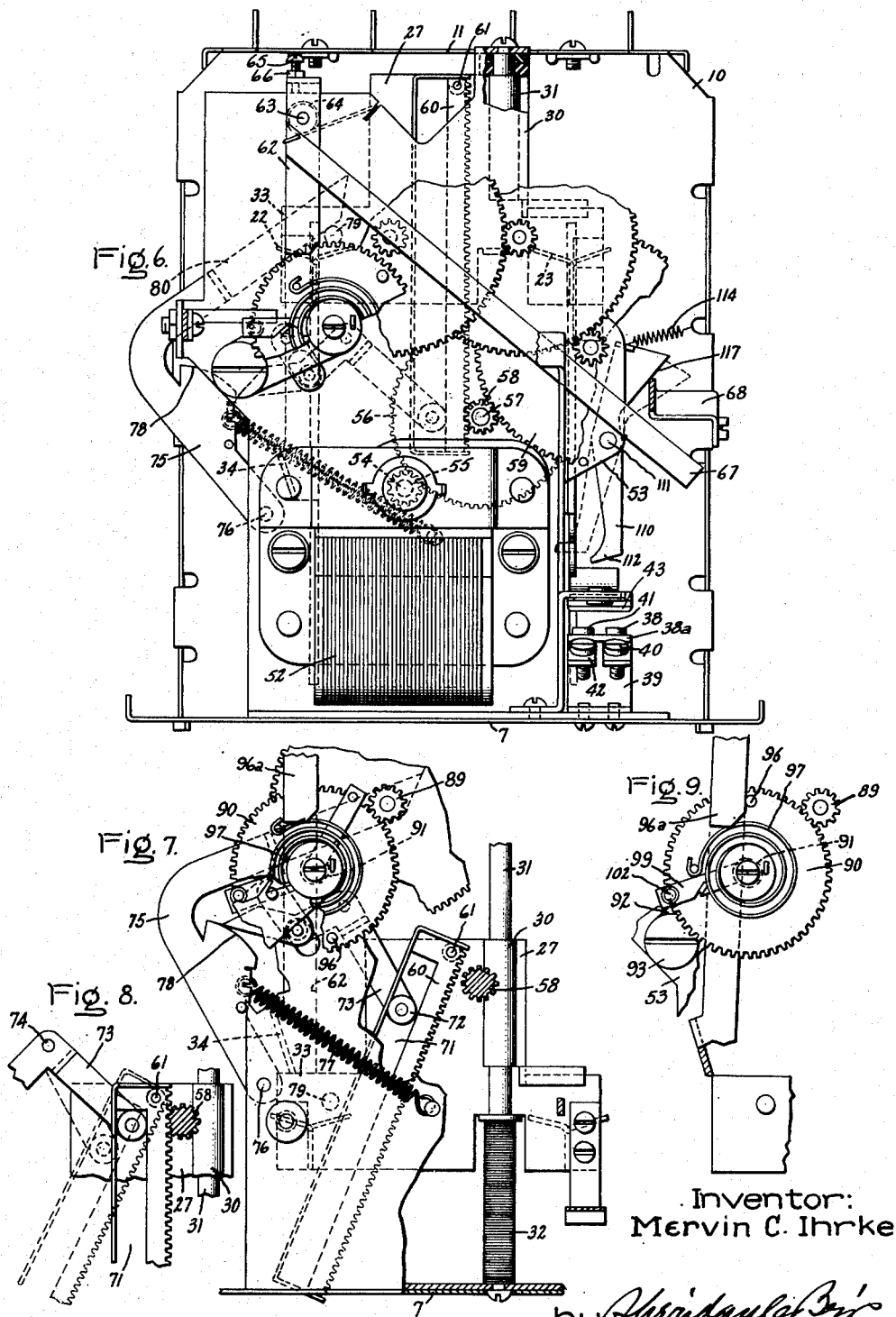
Inventor:
Mervin C. Ihrke,
by
His Attorney.

Patented Aug. 24, 1954

2,687,078

UNITED STATES PATENT OFFICE 2,687,078

AUTOMATIC ELECTRIC TOASTER WITH MOTOR DRIVEN CARRIAGE AND TIMER

Mervin C. Ihrke, Stratford, Conn., assignor to General Electric Company, a corporation of New York Application July 11, 1951, Serial No. 236,159

16 Claims. (Cl. 99—328)

This invention relates to cooking appliances, and more particularly to an automatic electric toaster. An object of my invention is to provide an electric cooking appliance, such as a toaster, which is operated entirely automatically, following an initial manual depression of a starting button or lever.

Automatic electric toasters have been proposed with an electric motor drive of a toast carriage between toasting and non-toasting positions. Also, electric toasters have been constructed having synchronous electric clock motors for timing the toasting cycle. However, it proves to be expensive to construct a toaster having one motor for the carriage drive and separate means for timing of the toasting cycle. Therefore, it is a primary object of my invention to effect operation of the toast carriage as well as automatic timing with a single electric motor providing the motive force for both functions.

It is also an object of my invention to provide automatic toast color temperature compensation and manual toast color control for a toaster having an induction or synchronous motor drive of the timing mechanism.

A further object of my invention is in an arrangement of a starting switch control for an automatic toaster, forming a part of the toaster carrying handle. This invention also has as one of its further objects the provision of manual means for terminating a toasting cycle at any time, upon which the mechanism automatically resets for the next cycle of operation.

In accomplishment of the foregoing objectives, as well as other objectives and advantages which will become apparent from the following disclosure, a feature of my invention consists in the use of a single induction or synchronous electric motor, serving both as the motive force for driving the toast carriage to its toasting position against a resilient biasing spring, and also as the drive for an automatic timer regulating the duration of the toasting cycle. The motor drive of the carriage is featured by a pinion and rack drive serving to lower the carriage to toasting position whereupon the rack is automatically disengaged, simultaneously engaging a timing gear sequence which subsequently trips the latch retaining the carriage in its toasting position. As the carriage rises under the influence of its biasing spring, a further feature of the invention automatically resets the drive and timing gearing for the next cycle of operation.

My invention will be better understood from the following description taken in connection with the accompanying drawings, and its scope will be pointed out with particularity in the appended claims.

Referring to the drawings, in Fig. 1 is shown a side elevation of a toaster, partially in section, embodying my invention; Fig. 2 is an end elevation, partially in section, of the toaster shown by Fig. 1; Fig. 3 is a partial cross sectional view of the switch operating mechanism in one of its positions; Fig. 4 is a partial cross sectional view similar to Fig. 3, but with the parts in a different operating position; Fig. 5 is an enlarged perspective and expanded view of the operating mechanism in accordance with my invention; Fig. 6 is an end elevation of the toaster operating mechanism in one of its positions; Fig. 7 is a partial end elevation of the operating mechanism in another of its operating positions; Fig. 8 is a partial view similar to Fig. 7 of a detail; and Fig. 9 is a partial view of the operating mechanism in still another operating position.

Referring now to the drawings, in Fig. 1, I have shown my invention as embodied in an electric toaster, having for example a plastic base 1 and a suitable decorative enclosing hood 2. Suitable carrying handles 3 and 4 may be formed as a part of base 1 for convenience in handling the toaster. Conventionally, the toaster is divided into a toasting compartment 5 and a mechanism compartment 6, both of which are enclosed by base 1 and hood 2. A base plate 7 defines the lower boundary of the toasting compartment and also serves to support the operating mechanism. As shown more clearly in Fig. 2, side walls 8 and 9, serving also as heat reflectors, enclose the sides of the toasting compartment; similarly end walls are provided as at 10 in Fig. 1. A top plate 11 completes the enclosure of the toasting compartment, this plate being formed to define toast receiving slots 12 and 13 in alignment with similar slots in the outer hood 2, as illustrated by Fig. 2. While the toaster shown here includes two toast receiving slots, obviously any number of such slots may be employed depending upon the desired capacity of the toaster. Within the toasting compartment are toaster heating elements 14, 15, 16 and 17 (Fig. 2), preferably with a pair of heating elements on opposite sides of each toast receiving slot. Sets of guide wires 18, 19 and 20, 21 are provided within the toasting compartment to hold slices in position equidistant from the heating elements.

Supporting means are provided within the toasting compartment for lowering slices of bread, muffins, or other food to be toasted down into the toasting compartment, and for raising the completed toast to an exposed position above the toaster upon completion of the cycle. This toast supporting means, as shown by Figs. 5 and 6, comprises racks 22 and 23, one in each of the toast receiving slots. Each rack may be fabricated with a plurality of laterally extending, alternatively oppositely directed ears 24 and 25 upon which a slice may rest. In accordance with usual practice, each of these ears may be apertured as at 26 to slidably receive one of the guide wires, such as 18 shown by Fig. 2. Each of the toast carrying racks includes a portion extending outwardly into the mechanism compartment 6 for attachment to a carriage supporting plate 27, as shown by Fig. 5. As here shown, rack 22 includes an end portion 28 bent over at right angles for attachment to the carriage plate by spot welding or similar method. Correspondingly, rack 23 includes a similar end portion 29 secured to carriage plate 27. Additionally, carriage plate 27 is formed with a bearing sleeve 30 encircling a carriage supporting shaft 31, which is rigidly supported between top plate 11 and base plate 7. A spring 32, as shown in Figs. 1 and 5, encircles the carriage supporting rod 31 between sleeve 30 and base plate 7, so that upon depression of the carriage assembly including racks 22 and 23 and carriage plate 27 to the lower toasting position, spring 32 is compressed as shown in Fig. 7. It is thus seen that the toast carriage is resiliently biased to its upper non-toasting position. As shown in Figs. 5, 6 and 7, carriage plate 27 includes on its left hand side a laterally projecting portion 33, the upper edge of which is adapted to be engaged under a latching member 34 when in the lower toasting position. The toast carriage is shown latched in its lower toasting position in Fig. 7, at which time spring 32 is compressed. When latch 34 is disengaged from the upper surface of portion 33 of the carriage plate, the carriage moves upwardly under the influence of spring 32.

A toasting operation is started by depression of a movable portion 35 of supporting handle 3. This arrangement is shown most clearly by Figs. 3 and 4. As shown, starting lever 35 is pivotally mounted to base 1 by a pin 36, which additionally extends through a bell crank 37, so that both lever 35 and bell crank 37 pivot about pin 36. A fixed contact 38 is riveted or otherwise secured to an insulating plate 38a, which in turn is carried by a bracket 39 affixed to base plate 7. A suitable terminal 40 may be provided for connection of a power supply lead to fixed contact 38. As shown in Fig. 6, a second fixed contact 41 is secured to the same insulating plate, laterally spaced from contact 38. Similarly, contact 41 is provided with a terminal 42. Referring again to Figs. 3 and 4, a bridging contact member 43 is carried by a resilient supporting arm 44 and insulated with respect thereto. The resilient or spring arm 44 is supported by a bracket 45 extending upwardly from the base plate. Thus, the bridging contact, which is normally biased away from the fixed contacts, is movable into and out of engagement to complete or open the circuit through contacts 38 and 41. Bell crank lever 37 is connected to a lost motion link 46 pivotally carried at 47 on bracket 45. The lower end of link 46 carries a roller 48 which is adapted to engage and press downwardly on the resilient arm 44. Figs. 1 and 4 show lever 37 and link 46 in normal position. In Fig. 3, starting lever 35 has been depressed resulting in an upward movement of the lower end of the bell-crank lever producing a corresponding upward movement of the upper end of lost motion link 46. Through the pivotal mounting of this link, roller 48 moves downwardly forcing the bridging contact 43 into engagement with fixed contacts 38 and 41 to complete the circuit to the toaster heating element and the toaster operating motor. As will become apparent later, closure of this circuit as described results in the toast carriage being driven downwardly to its lower toasting position. As shown in Fig. 4, carriage plate 27 carries a depending switch operating member 49 positioned to engage the outer end of spring arm 44 to maintain the bridging contact in engagement with the fixed contacts as long as the carriage is in its lower toasting position. In addition, the carriage includes a depending portion 50 adapted to engage the outer end 51 of bell crank 37 upon downward movement of the toast carriage to automatically reset the bell crank and starting lever to the initial starting position. Thus, Fig. 4 depicts the position of the switch and starting mechanism when the carriage is in its lower toasting position.

Closure of the switch by bridging contacts 37 and 41, as explained above, energizes both the toaster heating elements and a motor 52, which supplies the motive power for driving the carriage to its lower toasting position and for timing the ensuing toasting cycle. Referring first to Fig. 1, motor 52 and the various gears and levers of the drive and timing mechanism are supported on an angle bracket 53 secured at its upper end to top plate 11 and at its lower end to base plate 7. The operating mechanism will be more clearly understood by a reference to Fig. 5 in which most of supporting plate 53 has been broken away for clarity. Motor 52 may be of any suitable type, either direct current or alternating current, although preferably an induction or synchronous alternating current motor. Referring now to Fig. 5, the motor drive shaft is shown at 54 carrying a drive pinion 55 on its outer end. Drive pinion 55 in turn engages with a driven gear 56 fixed on a shaft 57 journaled in supporting plate 53. Fixed on shaft 57 is a pinion 58 which engages both a first idler gear 59 and a carriage drive rack 60. Rack 60 is pivotally attached to toaster carriage 27 on a pin 61, Figs. 6, 7, and 8. Hence, when the motor is energized the carriage is driven to its lower toasting position through pinion 55, gear 56, pinion 58, and rack 60.

At this point, it may be noted that latching arm 34 constitutes the lower termination of a U-shaped latching lever 62 pivotally mounted with respect to supporting plate 53 on a pin 63. This latching lever is resiliently biased by a spring 64 for rotation in a counterclockwise direction as viewed in Fig. 5. An adjusting screw and lock nut 65 and 66 respectively may be provided for adjusting the initial or normal angular position of latching lever 62. Latching arm 34 is inclined somewhat from a vertical position. Therefore, as carriage plate 27 moves downwardly, its outwardly extending portion 33 strikes the inclined surface of latching arm 34 and cams it in a clockwise direction. At such time as the carriage plate reaches its lowermost position, the outwardly projecting portion 33 has its top edge below latching arm 34, whereupon the latching arm, under the influence of biasing spring 64, moves in a counterclockwise direction to latch the carriage in its lower toasting position. The U-shaped latching lever 62 additionally includes a laterally extending portion 67 with its outer end positioned in the path of movement of a stop lever 68 pivotally mounted to the toaster frame. Lever 68 is resiliently biased to an upper non-engaging position by a spring 69. A finger operating knob 70 is included on the outer end of this lever, which knob is outside of the outer enclosing hood as shown in Figs. 1 and 5, the lever extending out through a slot 70a in the hood. By a depression of this lever into engagement with arm 67, it may be seen that the carriage latching arm 34 is moved in a clockwise direction to release the carriage for upward movement to its non-toasting position. Thus, a depression of stop lever 68 is effective to terminate a toasting operation at any time.

Since the driving motor continues to operate after the carriage has been driven to its lower position and latched as described above, this invention provides an arrangement for disengaging rack 60 from pinion 58. As shown in Fig. 5, rack 60 is longitudinally apertured substantially its full length at 71 to provide a track extending longitudinally of the rack. Operatively positioned within aperture 71 is a roller or follower 72 carried on one end of a crank 73 pivotally mounted on supporting plate 53 by pin 74. As the carriage and rack move downwardly driven by pinion 58, roller 72 finally comes into contact with the upper end of aperture 71, as shown in full lines in Fig. 8. Since rack 60 is pivotally mounted, pressure of roller 72 against the upper end of the aperture tends to rotate the rack in a clockwise direction as viewed in Figs. 5 and 8. As this clockwise rotation of rack 60 about pivot pin 61 commences, crank arm 73 also tends to rotate in a clockwise direction about its pivot pin 74. As shown in Fig. 5, an angular cam lever 75 is pivoted to supporting plate 53 at 76. Cam lever 75 is biased to the right against the opposite end of crank arm 73 by a spring 77. As the crank arm 73 rotates under the influence of the power drive of rack 60 and engagement of roller 72 with the upper end of the aperture in the rack, the pointed end of the crank eventually clears the upper corner of the cam portion 78 of the cam lever, whereupon cam lever 75 rotates in a clockwise direction around its pivot pin under the influence of spring 77, forcing crank arm 73 further in a clockwise direction to completely disengage rack 60 from driving pinion 58. With the motor thus completely disengaged from driving engagement with the carriage and the carriage latched in its lower toasting position, the motor may now provide the motive power for operating the automatic timing mechanism.

In actual operation, I prefer to use a relatively high speed motor, which, with the gear train shown, drives the carriage downwardly at relatively high speed. The inertia of the carriage as it reaches its lowermost position facilitates rapid rotation of rack 60 to quickly disengage its teeth from the teeth of pinion 58. As the disengagement is completed, the carriage may be allowed to rise slightly to the position shown in Fig. 7 and by the dotted lines in Fig. 8, with the latch 34 engaging and holding the carriage in its lower toasting position. This also positions rack 60 for return of the carriage to its upper non-toasting position by tripping latch 34.

In accordance with my invention, this carriage drive mechanism automatically resets itself for the next cycle of operation upon return of the carriage to its upper non-toasting position. For this purpose, a pin 79 is fixed to the latch portion 33 of carriage plate 27 to protrude outwardly. Cam lever 75 includes an upper portion 80 which is in the path of travel of pin 79 as the carriage moves upwardly. Therefore, as the carriage approaches its uppermost position, pin 79 moves the end 80 of lever 75 upwardly permitting crank 73 to return to the position shown in Fig. 5 from the position shown by Fig. 7. This counterclockwise rotation of crank lever 73 returns rack 60 into engagement with pinion 58 ready for the next cycle of operation.

When the carriage is in the lower toasting position and the rack is disengaged from the driving pinion as shown by Fig. 7, the motor is free to operate the automatic timing mechanism. As previously explained, pinion 58 from the motor drive is continuously in engagement with the first idler gear 59. Idler gear 59 is carried on a shaft 81 journaled in supporting plate 53, and fixed to the same shaft is a first idler pinion 82. First idler pinion 82 meshes with a second idler gear 83 carried on shaft 84 along with the second idler pinion 85. For further gear reduction I prefer to employ a third idler gear 86 and attached pinion 87 for driving a final timing drive gear 88 and its attached pinion 89. The final drive pinion 89 meshes with and rotates timing gear 90. It is to be understood that all of the above idler gears and pinions are journaled and supported by plate 53. Obviously, other timing gear sequences could be employed, such as worm and gear drives to accomplish the required gear reduction between motor shaft 54 and timing gear 90.

It is desirable that an automatic toaster timing mechanism should be capable of automatic adjustment depending upon initial toasting temperature at the beginning of the cycle. For example, the first cycle of operation when the toaster is cold must extend over a longer period of time than the immediately following cycle, since the second toasting operation will be performed considerably quicker due to residual heat in the toaster. Subsequent operations must be further shortened as the toaster temperature rises during each successive operation. In addition, tastes of the users of toasters vary widely, as to whether dark or light toast is desired. Therefore, I additionally provide a manual color control adjustment permitting the operator to set the mechanism for the desired color of the final toasted product.

Referring again to Fig. 5, timing gear 90 is journaled on a shaft 91 for rotation with respect thereto. Shaft 91 in turn is affixed to a link 92 pivotally mounted on plate 53 by a shouldered screw 93. With this arrangement, it may be seen that timing gear 90 is bodily movable about screw 93 into and out of engagement with the final drive pinion 89. To move the timing gear into and out of engagement with this pinion, a pin 94 is affixed to link 92 intermediate its ends. Pin 94 is also fixed to a timing gear operating lever 95 which in turn is pivotally attached to the rack operated crank 73. In the position shown in Fig. 5, rack 60 is in engagement with drive pinion 58 and timing gear 90 is out of engagement with pinion 89. These gears remain in this state until the toast carriage reaches its lowermost position, upon which rack 60 rotates in a clockwise direction, simultaneously rotating crank 73 as explained above. This crank rotation results in an upward movement of the timing gear operating lever 95, thus rotating link 92 and the timing gear about pivot 93 into engagement with driving pinion 89. In the position shown in Fig. 7, rack 60 is out of engagement with its driving pinion, whereas timing gear 90 is in engagement with its driving pinion. Therefore, subsequent operation of the motor driving through the timing gear train rotates timing gear 90. With the gear train shown, timing gear 90 rotates in a counterclockwise direction.

Affixed to the face of the timing gear is a trip pin 96. End 96ª of the trip lever 62 stands in the path of movement of pin 96. When pin 96 comes into engagement with the cooperating end 96ª of the U-shaped trip lever 62, the trip lever is rotated to release latch arm 34 from carriage plate 27. This terminates a toasting cycle, and as the carriage rises, rack 60 returns into engagement with its driving pinion as explained above. Simultaneously, crank lever 73 rotates in a counterclockwise direction pulling operating link 95 downwardly, which through pin 94 and link 92 retracts timing gear 90 from engagement with its driving pinion 89.

To provide automatic temperature compensation and color control, timing gear 90 is journaled on its shaft 91 and is free to rotate with respect thereto. A spiralled bimetallic element 97 has one of its ends attached to a pin 98 which in turn is fixed to gear 90, while the other end of the bimetallic element is attached to shaft 91 as shown in Fig. 5. The bimetallic element may be of a type well known in the art, having two dissimilar metals with different temperature coefficients of expansion welded together. In this particular instance the arrangement is such that as the bimetal heats up in response to the residual heat of the toaster, gear 90 is rotated on its shaft 91 in a counterclockwise direction as viewed in Figs. 5, 6, 7 and 9. Thus, trip pin 96 is brought into closer proximity to the U-shaped latch lever 62, tending to shorten the duration of the toasting cycle.

Additionally, a color control link 99 is affixed to shaft 91 by screw 100. Through the use of a coiled spring 101, this link is biased in a clockwise direction. The outer end of link 99 carries a pin 102 adapted to be engaged by the inwardly turned end 103 of a color control lever 104. Lever 104 is pivotally mounted on an upwardly projecting portion 105 of supporting plate 53. The outer end of lever 104 projects outwardly through the outer enclosing hood 2 as shown in Fig. 2, and includes on its outer end a knob 106 for manual movement. Hence, an upward movement of knob 106 rotates color control link 99 in a counterclockwise direction, simultaneously rotating shaft 91. Through the connection of the shaft to gear 90 through bimetallic element 97, the timing gear is also rotated in a counterclockwise direction tending to shorten the duration of the toasting cycle. If on the contrary, color control knob 106 is moved downwardly, resilient biasing spring 101 results in a clockwise rotation of link 99 and a corresponding clockwise rotation of timing gear 90 to increase the duration of the toasting cycle for producing darker toast.

In connection with stop lever 68, there is provided a mechanism which may be set to permit the carriage plate 27, when released, to move toward non-toasting position by an amount only sufficient to effect movement of contact member 43 away from contacts 38 and 41, thus opening the electric circuit of the toaster but keeping the carriage in a position such that the toasted bread is still down between the heating elements where it will keep warm. To this end, there is provided a lever 110 pivoted on angle bracket 53 as shown at 111, Figs. 5 and 6. The lower end of lever 110 is provided with a toe 112 and the lever is biased to a position where toe 112 stands in the path of movement of a projection 113, Fig. 5, on carriage plate 27 by a biasing spring 114, which at one end is connected to a wing 115 at the upper end of lever 110 and at the other end to a fixed arm 116. The upper arm of lever 110 on the side presented to stop lever 68 is shaped to provide a cam surface 117 with which stop lever 68 cooperates. When stop lever 68 is in its upper or "pop-up" position as shown in Fig. 5 and Fig. 6, it engages lever 110 to hold it in a retracted position where toe 112 is out of the path of movement of projection 113. When stop lever 68 is moved down to the "keep-warm" position indicated in Fig. 5 and moved into the notch 118 near the upper end of slot 70ª to hold it, the stop lever moves away from cam surfaces 117 permitting lever 110 to turn sufficiently to bring toe 112 to a position above projection 113. Now, when the toaster carriage is released by the timing mechanism, it can move upward toward non-toasting position only until projection 113 engages the underside of toe 112, a movement sufficient to open the toaster circuit, and will be held until such time as stop lever 68 is returned to "pop-up" position so as to turn lever 110 to move toe 112 away from over projection 113. Lever 110 is shown in its "keep-warm" position in dotted lines in Fig. 6.

Operation of this toaster becomes apparent from the above description. After placing a slice to be toasted in one of the bread receiving slots, starting lever 35 is briefly depressed to simultaneously energize both the toaster heating elements and driving motor 52. Through motor pinion 55, gear 56, pinion 58, and the carriage rack 60, the toast carriage is lowered to its toasting position with motor 52 providing the necessary power. As the carriage reaches the lower position, rack 60 pivots about its supporting pin 61, disengaging the carriage drive, and simultaneously through crank 73, link 95, pin 94 and link 92 engages the timing gear with its driving pinion 89. The rotational position of timing gear 90 has been preselected in advance, manually by color control knob 106 and automatically in response to toaster temperature by bimetallic element 97. As the motor continues to drive the timing gear train, timing gear 90 is rotated until pin 96 affixed to this gear rotates the latching lever and trips latch 34 from engagement with the toast carriage. Immediately, the toast carriage rises to its upper non-toasting position under the influence of spring 32, exposing the completed toast for ready removal. The upward movement of the toast carriage automatically disengages timing gear 90 and engages rack 60 with the motor drive, ready for the next cycle of operation. The timing gear automatically readjusts itself under the influence of bimetal 97 to compensate for the increased toaster temperature.

From the foregoing, it is seen that I have provided an automatic electric toaster employing a single electric motor drive which functions both to lower the carriage to its toasting position and to time the toasting cycle. Entire operation is completely automatic following the depression of a starting button. Furthermore, as the toasting cycle is completed the operating mechanism automatically resets itself for the next cycle of operation including automatic compensation for the increased toaster temperature. Also, any cycle of operation may be interrupted, upon which the mechanism again resets in readiness for a subsequent cycle. At any time before a cycle is commenced, the operator can readily adjust the mechanism to vary the degree of toasting.

While the present invention has been described by reference to a particular embodiment thereof, it is to be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In an automatic electric toaster having a toast carriage movable between a toasting position and a non-toasting position and resiliently biased to said non-toasting position, an electric motor, a first gear train operable by and normally connected to said motor for moving said carriage to said toasting position against the action of said resilient means, a second gear train operable by and normally disconnected from said motor to time the toaster operation, a latch to retain said carriage in toasting position, and means disengaging said first gear train from the motor upon movement of said carriage to said toasting position and simultaneously connecting said second gear train to the motor for timing the toasting operation, said second gear train including means for tripping said latch to terminate toaster operation and permit said carriage to be returned to non-toasting position by said resilient means.

2. In an automatic electric toaster, a toast carriage movable between non-toasting and toasting positions, resilient means biasing said carriage to its non-toasting position, and a combined power drive and timing mechanism for the toast carriage comprising an electric motor, manually operated means for energizing said motor to commence a toasting operation, a gear drive operable by and normally connected to said motor to move said carriage to its toasting position, latching means for retaining said carriage in said toasting position, means disengaging said gear drive from said motor upon movement of said carriage to its toasting position, timing gears normally disconnected from said motor, and means actuated upon disengagement of said gear drive from said motor for connecting said timing gears to the motor, one of said timing gears including means for releasing said carriage from said latching means after a predetermined period of time, whereby said resilient means may return the carriage to non-toasting position.

3. In an automatic electric toaster, a toaster frame, a power drive mechanism comprising rotary electromagnetic means including a drive gear, a toast carriage resiliently biased to a non-toasting position, a gear rack pivotally carried by said carriage and adapted to engage said drive gear, said gear rack including a track, lever means pivotally carried by the toaster frame and having a follower on one of its ends movable along said track, said lever means in one of its positions forcing said rack into engagement with said drive gear, and means displacing said lever upon movement of said carriage downwardly to its toasting position to disengage said rack from the drive gear, said last named means simultaneously latching said carriage in toasting position.

4. In an automatic electric toaster having a toast carriage movable between toasting and non-toasting positions and resiliently biased to its non-toasting position, a power drive and timing mechanism comprising an electric motor including a drive pinion, a rack pivotally attached to the carriage adjacent one of its ends, said rack including an enclosed track, a timing gear reduction including a final timing gear and a first driven gear, both said first driven gear and said rack being operatively associated with said motor drive pinion for operation thereby, a pivotally mounted arm having a follower adjacent one end operable in said enclosed track, said follower being eccentrically positioned with respect to the pivotal mounting of said rack whereby movement of said carriage to its toasting position engages said roller with an end of said track to rotate said rack out of engagement with said motor drive pinion, the simultaneous displacement of said pivotally mounted arm moving at least one of the gears of said timing gear reduction into operative engagement for rotation by said motor drive pinion to rotate said final timing gear, latching means engageable with said toast carriage upon its movement to toasting position to prevent movement of the carriage to its non-toasting position under the influence of said resilient bias, and means carried by said final timing gear for releasing said latching means whereupon said carriage returns to its non-toasting position, movement of said carriage to non-toasting position also displacing said pivotally mounted arm and follower to force said rack back into engagement with said motor drive pinion with simultaneous disengagement of said one timing gear.

5. In an automatic electric toaster, a toast carriage movable between toasting and non-toasting positions and resiliently biased to its non-toasting position, a geared rack pivotally attached to said carriage, an electric motor including a drive pinion for operative engagement with said rack whereby operation of said motor drives said carriage to its toasting position, means effective upon movement of said carriage to toasting position for rotating said rack out of engagement with said driving pinion, timing gearing normally disconnected from said drive pinion, and means actuated by said rack when moved out of engagement with said drive pinion for connecting the drive pinion to said timing gearing.

6. In an automatic electric toaster of the type having a toast carriage resiliently biased to a non-toasting position and movable to toasting position, a power drive and timing mechanism comprising an electric motor including a drive pinion, a geared rack pivotally attached at one of its ends to said carriage and adapted to engage said drive pinion, said rack being slotted longitudinally substantially its full length, a pivotally supported crank arm having a follower positioned in said slot, said slot and follower being eccentrically disposed with respect to the pivotal mounting of said rack, drive of said rack to toasting position by said motor drive pinion being effective to rotate said rack at the end of its longitudinal movement through said eccentric connection with said follower to move the rack from engagement with the drive pinion, resiliently biased cam means rendered effective upon initial rotation of said rack to further rotate said rack out of engagement with said drive pinion, and latch means engageable with said carriage to restrain return of said carriage to its non-toasting position.

7. In an automatic electric toaster having a toast carriage resiliently biased to non-toasting position and movable to toasting position and latching means for retaining said carriage in its toasting position, an electric motor driven timing mechanism comprising an electric motor, a gear reduction including a final gear and a timing gear, said timing gear being pivotally supported with respect to the final gear of said gear reduction and adapted to move into and out of engagement with said final gear, said timing gear when out of engagement being independently rotatable, bimetallic means connected to said timing gear and sensitive to toaster temperature for effecting rotation of said timing gear, manually operated color control means connected to said timing gear for effecting rotation of said timing gear, means responsive to movement of said carriage to its toasting position for moving said timing gear into engagement with the final gear of said gear reduction, and means on said timing gear effective after a predetermined rotation thereof for releasing said latching means, to permit said carriage to return to its non-toasting position.

8. In an automatic electric toaster having a toast carriage resiliently biased to non-toasting position and movable to toasting position and latching means for retaining said carriage in its toasting position, an electric motor driven timing mechanism comprising an electric motor, a gear reduction including a final gear and timing gear, said timing gear being pivotally supported with respect to the final gear of said gear reduction and adapted to move into and out of engagement with said final gear, said timing gear when out of engagement being independently rotatable, bimetallic means sensitive to toaster temperature for effecting rotation of said timing gear, means responsive to movement of said carriage to its toasting position for rotating said timing gear into engagement with the final gear of said gear reduction, and means on said timing gear for releasing said latching means to permit said carriage to return to its non-toasting position under the influence of its resilient bias.

9. In an automatic electric toaster having a toast carriage movable between toasting and non-toasting positions and resiliently biased to its non-toasting position, a power drive and timing mechanism comprising an electric motor including a drive pinion, a geared rack pivotally attached at one of its ends to said carriage, said rack including an elongated slot, a crank arm having a roller on one of its ends operatively positioned within said slot, said roller and slot being eccentrically disposed with respect to the pivotal mounting of said rack whereby movement of said rack to its extremity corresponding to toasting position by said motor drive rotates said rack out of engagement with said drive pinion, a timing gear reduction including a timing gear and a first driven gear in engagement with said motor drive pinion, said timing gear being pivotally mounted for movement into and out of engagement with said gear reduction, means operated by said crank arm upon rotation of said rack out of engagement with said motor drive pinion for simultaneously rotating said timing gear into engagement with said gear reduction, means latching said carriage in its toasting position upon disengagement of said rack, means on said timing gear for disengaging said latching means, and means on said carriage operatively associated with said crank for moving said timing gear out of engagement and said rack into engagement with their respective drives upon movement of said carriage to its non-toasting position.

10. In an automatic electric toaster having a toast carriage movable between toasting and non-toasting positions and resiliently biased to its non-toasting position, a power drive and timing mechanism comprising an electric motor including a drive pinion, a geared rack pivotally attached at one of its ends to said carriage, said rack including an elongated slot, a crank arm having a roller on one of its ends operatively positioned within said slot, said roller and slot being eccentrically disposed with respect to the pivotal mounting of said rack, whereby movement of said rack to its extremity corresponding to toasting position by said motor drive rotates said rack out of engagement with said drive pinion, a timing gear reduction including a final timing gear and a first driven gear in engagement with said motor drive pinion, said final timing gear being pivotally mounted for movement into and out of engagement with said gear reduction, means operated by said crank arm upon rotation of said rack out of engagement with said motor drive pinion for simultaneously rotating said timing gear into engagement with said gear reduction, means latching said carriage in its toasting position upon disengagement of said rack, means on said final timing gear for disengaging said latching means, means on said carriage operatively associated with said crank for moving said timing gear out of engagement and said rack into engagement with their respective drives upon movement of said carriage to its non-toasting position, said final timing gear being independently rotatable with respect to said gear reduction when out of engagement, temperature sensitive means responsive to toaster temperature for independently rotating said final timing gear, and manually operable color control means for independently rotating said final timing gear.

11. In an automatic electric toaster, a toast carriage movable from non-toasting to toasting position, means connected with the carriage which biases it towards non-toasting position, latch means for holding the carriage in toasting position against the action of said biasing means, gear means connected with the carriage through which it is moved from non-toasting position to toasting position, a motor timing mechanism, disconnected from said motor when the carriage is in non-toasting position, means connecting the motor with said gear means for effecting movement of the carriage from non-toasting to toasting position, means operated by movement of said carriage and said gear means to effect engagement between said latch means and said carriage, disengagement of said gear means from said motor and connection of the motor to said timing mechanism, and means carried by the timing mechanism for effecting disengagement of said latch means from said carriage to permit the carriage to return to non-toasting position.

12. In an automatic toaster, a toaster carriage movable from non-toasting position to toasting position, means connected with the carriage for biasing it to non-toasting position, a latch for holding the carriage in toasting position against the action of said biasing means, a motor having a driving pinion, a rack connected with the carriage and engageable with the pinion to connect the motor to the carriage to move the carriage from non-toasting position to toasting position and effect engagement between the carriage and said latch for holding the carriage in toasting position, a timer including a timing gear which is disconnected from said driving pinion when the carriage is in non-toasting position, means actuated by movement of said carriage to effect disengagement of the rack from said driving pinion and a driving connection between said pinion and said timing gear, and means actuated by movement of the timing gear to effect release of said latch to permit the carriage to return to non-toasting position.

13. In an automatic electric toaster, a toast carriage movable from non-toasting to toasting position, means connected with the carriage which biases it towards non-toasting position, latch means for holding the carriage in toasting position against the action of said biasing means, gear means connected with the carriage through which it is moved from non-toasting position to toasting position, a motor, timing mechanism disconnected from said motor when the carriage is in non-toasting position, means connecting the motor with said gear means for effecting movement of the carriage from non-toasting to toasting position, means operated by movement of said carriage and said gear means to effect engagement between said latch means and said carriage, disengagement of said gear means from said motor and connection of the motor to said timing mechanism, and means which forms a part of the timing mechanism for effecting disengagement of said latch means from said carriage to permit the carriage to return to non-toasting position, said means which forms a part of the timing mechanism comprising a timing gear having a projection which engages said latch means to effect such disengagement, and temperature responsive means for turning the timing gear to adjust the distance between said projection and said latch means.

14. In an automatic toaster, a toaster carriage movable from non-toasting position to toasting position, means connected with the carriage for biasing it to non-toasting position, a latch for holding the carriage in toasting position against the action of said biasing means, a motor having a driving pinion, a rack connected with the carriage and engageable with the pinion to connect the motor to the carriage to move the carriage from non-toasting position to toasting position and effect engagement between the carriage and said latch for holding the carriage in toasting position, a timer including a timing gear which is disconnected from said motor when the carriage is in non-toasting position, means actuated by movement of said carriage to effect disengagement of the rack from said driving pinion and connection between said pinion and said timing gear, means actuated by movement of the timing gear to effect release of said latch to permit the carriage to return to non-toasting position, and means actuated by movement of the carriage to non-toasting position to effect disengagement of the driving pinion from the timing gear.

15. In an automatic electric toaster, a toast carriage movable from non-toasting to toasting position, means connected with the carriage which biases it towards non-toasting position, latch means for holding the carriage in toasting position against the action of said biasing means, gear means connected with the carriage through which it is moved from non-toasting position to toasting position, a motor, timing mechanism disconnected from said motor when said carriage is in non-toasting position, means connecting the motor with said gear means for effecting movement of the carriage from non-toasting to toasting position, means operated by movement of said carriage and said gear means to effect engagement between said latch means and said carriage, disengagement of said gear means from said motor, and connection of the motor to said timing mechanism, means carried by the timing mechanism for effecting disengagement of said latch means from said carriage to permit the carriage to return to non-toasting position, and means actuated by movement of the carriage to non-toasting position to effect disengagement of the driving connection between the motor and said timing mechanism.

16. In an automatic electric toaster having a toast carriage movable between non-toasting and toasting positions, means biasing the toast carriage to non-toasting position, and holding means for retaining the toast carriage in toasting position, electric motor-driven timing mechanism for releasing said holding means to permit the toast carriage to be returned from toasting position to non-toasting position by said biasing means comprising an electric motor, a gear reduction including a final gear and a timing gear, said timing gear being pivotally supported with respect to the final gear of said gear reduction and adapted to move into and out of engagement with said final gear, said timing gear when out of engagement being independently rotatable, bimetallic means sensitive to toaster temperature for effecting rotation of said timing gear, means responsive to movement of said carriage to its toasting position for rotating said timing gear into engagement with the final gear of said gear reduction, and means on said timing gear effective after a predetermined rotation thereof for releasing said holding means to permit the carriage to return to its non-toasting position.

References Cited in the file of this patent

UNITED STATES PATENTS

| Number | Name | Date |
|---|---|---|
| Re. 21,336 | Graham | Jan. 30, 1940 |
| 1,795,013 | Denman | Mar. 3, 1931 |
| 1,967,209 | Lawrence | July 17, 1934 |
| 1,987,703 | O'Neill | Jan. 15, 1935 |
| 2,165,204 | Anderson | July 11, 1939 |
| 2,307,347 | Anderson | Jan. 5, 1943 |
| 2,347,385 | Wright et al. | Apr. 25, 1944 |
| 2,347,611 | Purpura | Apr. 25, 1944 |
| 2,359,580 | Poole | Oct. 3, 1944 |
| 2,531,138 | Lehde | Nov. 21, 1950 |
| 2,594,528 | White | Apr. 29, 1952 |